US012652591B2

(12) United States Patent
Griesmer et al.

(10) Patent No.: US 12,652,591 B2
(45) Date of Patent: Jun. 9, 2026

(54) COMMUNICATIONS SUPPORT FOR CONNECTED VEHICLES

(71) Applicant: AT&T Intellectual Property I, L.P., Atlanta, GA (US)

(72) Inventors: Stephen Griesmer, Westfield, NJ (US); Naveen Atukuri, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 583 days.

(21) Appl. No.: 18/089,906

(22) Filed: Dec. 28, 2022

(65) Prior Publication Data

US 2024/0224142 A1 Jul. 4, 2024

(51) Int. Cl.
| | |
|---|---|
| *H04W 4/00* | (2018.01) |
| *H04W 36/08* | (2009.01) |
| *H04W 36/30* | (2009.01) |
| *H04W 36/32* | (2009.01) |
| *H04W 72/56* | (2023.01) |

(52) U.S. Cl.
CPC ........... *H04W 36/08* (2013.01); *H04W 36/30* (2013.01); *H04W 36/32* (2013.01); *H04W 72/56* (2023.01)

(58) Field of Classification Search
CPC ..... H04W 36/08; H04W 36/30; H04W 36/32; H04W 72/56; H04W 24/02
USPC ......................................................... 370/331
See application file for complete search history.

(56) References Cited

U.S. PATENT DOCUMENTS

| | | | | | |
|---|---|---|---|---|---|
| 6,925,378 | B2 * | 8/2005 | Tzamaloukas | ..... | G01C 21/3492 |
| | | | | | 701/428 |
| 7,076,365 | B2 * | 7/2006 | Tzamaloukas | ......... | G01C 21/28 |
| | | | | | 342/357.395 |
| 7,188,026 | B2 * | 3/2007 | Tzamaloukas | ... | G08G 1/096811 |
| | | | | | 455/414.2 |
| 8,675,514 | B2 * | 3/2014 | Myers | .................... | H04W 24/06 |
| | | | | | 370/242 |
| 8,917,207 | B2 * | 12/2014 | Frisco | ................ | H04N 21/2146 |
| | | | | | 342/359 |
| 8,937,930 | B2 * | 1/2015 | Sprigg | .................. | G06F 9/4411 |
| | | | | | 709/204 |
| 9,258,432 | B2 * | 2/2016 | Lauer | ..................... | G06Q 50/40 |
| 9,762,431 | B2 * | 9/2017 | Nii | ........................ | B60R 16/023 |
| 9,794,815 | B2 * | 10/2017 | Lauer | .................. | H04M 15/856 |
| 10,652,074 | B2 * | 5/2020 | Zhao | ........................ | H04W 4/46 |
| 10,892,946 | B2 * | 1/2021 | Correia e Costa | ... | H04W 48/18 |
| 11,069,161 | B2 * | 7/2021 | Soltani Bozchalooi | ..................... | |
| | | | | | G07C 5/0808 |
| 11,228,880 | B2 * | 1/2022 | Aldana | ................. | H04W 8/005 |
| 11,438,792 | B2 * | 9/2022 | Zhou | ........................ | H04W 8/04 |
| 11,463,337 | B2 * | 10/2022 | Walsh | .................... | G07C 5/008 |
| 11,514,800 | B2 * | 11/2022 | Kahn | .................. | G05D 1/1062 |

(Continued)

*Primary Examiner* — Amancio Gonzalez
(74) *Attorney, Agent, or Firm* — Hartman & Citrin LLC

(57) ABSTRACT

Concepts and technologies disclosed herein are directed to communication support for connected vehicles. According to one aspect disclosed herein, a vehicle communication support system can receive data from a connected vehicle operating in communication with a network. The vehicle communication support system can determine whether the connected vehicle has experienced a network degradation. In response to determining that the connected vehicle has experienced network degradation, the vehicle communication support system can instruct at least one network component to change at least one aspect of the network to overcome the network degradation.

17 Claims, 7 Drawing Sheets

200

BEGIN

202
CONNECTED VEHICLE CONNECTS TO NETWORK AND PROVIDES DATA TO VEHICLE COMMUNICATION SUPPORT SYSTEM

204
VEHICLE COMMUNICATION SUPPORT SYSTEM UTILIZES DATA RECEIVED FROM CONNECTED VEHICLE (AND OPTIONALLY NETWORK PERFORMANCE ESTIMATE(S)) TO DETERMINE WHETHER CONNECTED VEHICLE HAS EXPERIENCED (OR WILL EXPERIENCE BASED ON NETWORK PERFORMANCE ESTIMATE(S)) NETWORK DEGRADATION

206
VEHICLE COMMUNICATION SUPPORT SYSTEM MONITORS FAILURES ALONG ROADS DURING KNOWN PERIODS OF POTENTIAL NETWORK DEGRADATION

208
IN RESPONSE TO DETERMINING THAT CONNECTED VEHICLE HAS EXPERIENCED/WILL EXPERIENCE NETWORK DEGRADATION, INSTRUCTING ONE OR MORE NETWORK COMPONENTS TO CHANGE ASPECT(S) OF NETWORK TO OVERCOME NETWORK DEGRADATION

210
END

(56) References Cited

U.S. PATENT DOCUMENTS

| | | | | |
|---|---|---|---|---|
| 11,560,057 B2 * | 1/2023 | Kim | | B60K 35/28 |
| 11,816,543 B2 * | 11/2023 | Ben-Ezra | | G06N 3/08 |
| 12,118,830 B2 * | 10/2024 | Fang | | G07C 5/0808 |
| 12,156,072 B2 * | 11/2024 | Nandakumar Raghav | | |
| | | | | H04L 43/16 |
| 12,302,413 B2 * | 5/2025 | Hwang | | H04W 76/14 |
| 12,325,434 B2 * | 6/2025 | Ran | | B60W 60/001 |
| 12,328,178 B2 * | 6/2025 | Inai | | H04B 7/18541 |
| 12,333,868 B2 * | 6/2025 | Biemer | | G07C 5/08 |
| 2014/0149572 A1 * | 5/2014 | Menezes | | H04L 67/14 |
| | | | | 709/224 |
| 2015/0322873 A1 * | 11/2015 | Chen | | B60W 50/085 |
| | | | | 701/110 |
| 2015/0350457 A1 * | 12/2015 | Lauer | | H04M 15/8083 |
| | | | | 455/408 |
| 2016/0127934 A1 * | 5/2016 | Lauer | | H04M 15/842 |
| | | | | 455/408 |
| 2019/0124253 A1 * | 4/2019 | Lee | | H04N 5/268 |
| 2019/0394513 A1 * | 12/2019 | Shin | | H04N 21/44004 |
| 2020/0117929 A1 * | 4/2020 | Moon | | G06T 7/254 |
| 2020/0271459 A1 * | 8/2020 | Lee | | G08G 1/22 |
| 2021/0331712 A1 * | 10/2021 | Lee | | B60W 50/14 |
| 2022/0214176 A1 * | 7/2022 | Kim | | G08G 1/096725 |
| 2022/0319329 A1 * | 10/2022 | Kim | | B60W 40/04 |
| 2022/0343760 A1 * | 10/2022 | Baek | | G08G 1/162 |
| 2022/0386178 A1 * | 12/2022 | Park | | H04W 76/11 |
| 2022/0415181 A1 * | 12/2022 | Wang | | G08G 1/096775 |
| 2023/0007453 A1 * | 1/2023 | Higuchi | | H04W 4/40 |
| 2023/0283376 A1 * | 9/2023 | Morser | | H04B 10/25759 |
| | | | | 398/115 |
| 2023/0379675 A1 * | 11/2023 | Zhang | | H04W 4/46 |
| 2024/0053156 A1 * | 2/2024 | Jeschke | | G01C 21/3492 |
| 2024/0221500 A1 * | 7/2024 | Torgerson | | G08G 1/0112 |

* cited by examiner

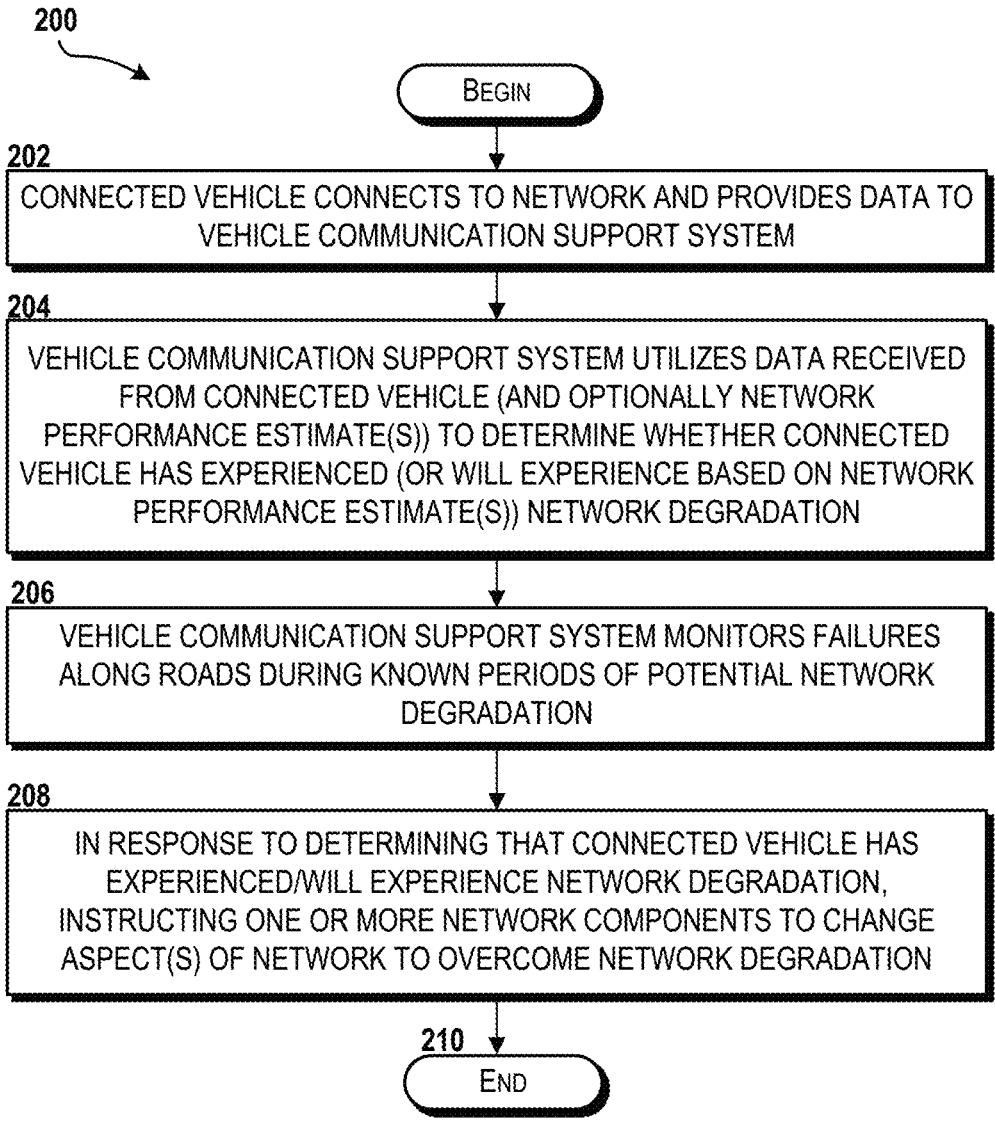

200

BEGIN

202
CONNECTED VEHICLE CONNECTS TO NETWORK AND PROVIDES DATA TO VEHICLE COMMUNICATION SUPPORT SYSTEM

204
VEHICLE COMMUNICATION SUPPORT SYSTEM UTILIZES DATA RECEIVED FROM CONNECTED VEHICLE (AND OPTIONALLY NETWORK PERFORMANCE ESTIMATE(S)) TO DETERMINE WHETHER CONNECTED VEHICLE HAS EXPERIENCED (OR WILL EXPERIENCE BASED ON NETWORK PERFORMANCE ESTIMATE(S)) NETWORK DEGRADATION

206
VEHICLE COMMUNICATION SUPPORT SYSTEM MONITORS FAILURES ALONG ROADS DURING KNOWN PERIODS OF POTENTIAL NETWORK DEGRADATION

208
IN RESPONSE TO DETERMINING THAT CONNECTED VEHICLE HAS EXPERIENCED/WILL EXPERIENCE NETWORK DEGRADATION, INSTRUCTING ONE OR MORE NETWORK COMPONENTS TO CHANGE ASPECT(S) OF NETWORK TO OVERCOME NETWORK DEGRADATION

210
END

COMMUNICATIONS SUPPORT FOR CONNECTED VEHICLES

BACKGROUND

In recent years, mobile network operators have experienced a dramatic increase in traffic on their networks, and this trend will likely continue. This increase in traffic has been caused in part by the increased adoption of mobile devices, such as smartphones and other mobile devices, that rely on mobile telecommunications networks as well as the migration of many customers from utilizing landline telecommunication services to utilizing mobile telecommunication services for their communications needs. To meet the demands of higher traffic and to improve the end user experience, mobile telecommunications operators are examining mechanisms by which to improve network efficiency, network capacity, and the end user experience, while keeping operational costs at a level conducive to maintaining competitive rates for the services they provide.

The internet of things ("IoT") is a concept of making physical objects, collectively "things," network addressable to facilitate interconnectivity for the exchange of data via a network, such as cellular network. The number of IoT devices deployed and operating in communication with an operator's network is expected to increase dramatically over the next several years, thereby further compromising network resources. Connected vehicles, also known as smart vehicles, are one type of IoT device that is expected to increase as new vehicles are deployed with technology to enable communications with cellular networks.

SUMMARY

Concepts and technologies disclosed herein are directed to communications support for connected vehicles. According to one aspect of the concepts and technologies disclosed herein, a vehicle communication support system can send and receive data from a connected vehicle operating in communication with a network. The vehicle communication support system can determine whether the connected vehicle has experienced a network degradation. In response to determining that the connected vehicle has experienced network degradation, the vehicle communication support system can instruct at least one network component to change at least one aspect of the network to overcome the network degradation.

In some embodiments, the data includes driving data and connection data. The driving data can identify a geographic location of the connected vehicle. The connection data can identify at least one base station to which the connected vehicle was connected and at least one corresponding cell within the network. The vehicle communication support system can determine whether the connected vehicle has experienced the network degradation based upon a driving pattern derived, at least in part, from the driving data. The driving pattern can be further derived from the connection data.

In some embodiments, the vehicle communication support system can estimate a network performance for the network. The vehicle communication support system determines whether the connected vehicle will experience the network degradation based upon the network performance estimate.

In some embodiments, the vehicle communication support system can instruct the at least one network component to change the at least one aspect of the network to overcome the network degradation by designating network traffic from moving vehicles with a higher priority than network traffic from stationary vehicles. In some embodiments, the vehicle communication support system can instruct the at least one network component to change the at least one aspect of the network to overcome the network degradation by failing over network traffic. In some embodiments, the vehicle communication support system can instruct the at least one network component to change the at least one aspect of the network to overcome the network degradation by re-routing network traffic around the network degradation using tunneling protocols. In some embodiments, the vehicle communication support system can instruct the at least one network component to change the at least one aspect of the network to overcome the network degradation by instructing a software-defined network ("SDN") controller to change the at least one aspect. The at least one aspect can include an aspect of a radio access network ("RAN") of the network, an aspect of a network edge of the network, or an aspect of a core network of the network. In some embodiments, the vehicle communication support system can instruct the at least one network component to change the at least one aspect of the network to overcome the network degradation by deploying one or more mobile radio elements. The mobile radio element(s) can be standalone or can be integrated with the network.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a flow diagram illustrating aspects of a method for providing communication support for a connected vehicle, according to an illustrative embodiment of the concepts and technologies disclosed herein.

DETAILED DESCRIPTION

Figure 1:
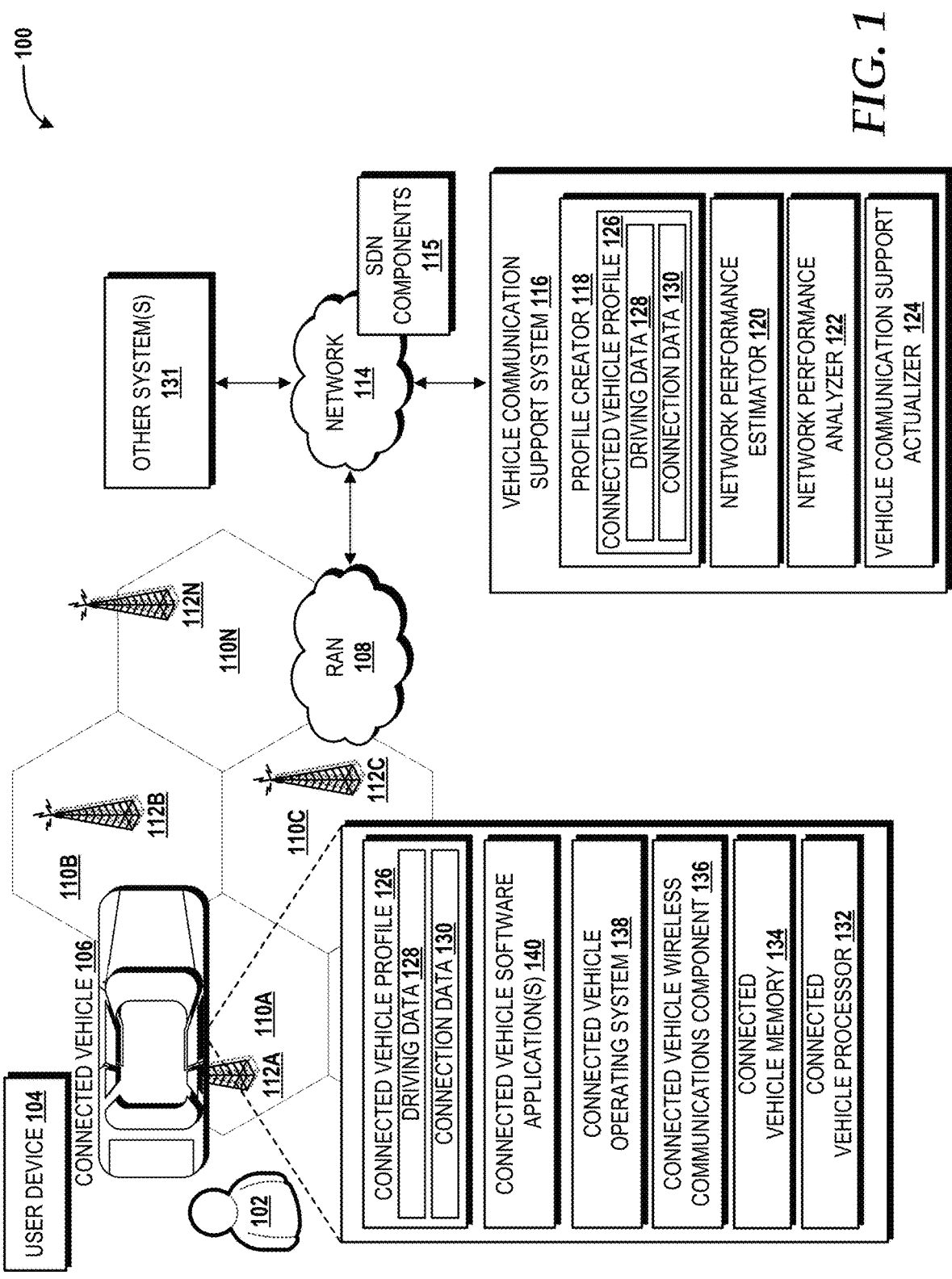
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, Drones, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of communications support for connected vehicles will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a user 102 who is associated with a user device 104 and a connected vehicle 106. The user device 104 and the connected vehicle 106 are both configured to connect to and communicate with one or more radio access networks ("RANs") 108 over an air/radio interface. The illustrated RAN 108 includes a plurality of cells 110A-110N, each of which is served by one or more base stations 112A-112N. As used herein, a "cell" refers to a geographical area that is served by one or more base stations operating within a RAN, such as the RAN 108. As used herein, a "base station" refers to a radio receiver and/or transmitter (collectively, transceiver) that is/are configured to provide a radio/air interface by which devices, such as the user device 104 and the connected vehicle 106, can connect to one or more networks 114. Accordingly, a base station is intended to encompass one or more base transceiver stations ("BTSs"), one or more NodeBs, one or more eNodeBs, one or more 5G new radio ("5G-NR"), one or more gNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves.

According to various embodiments, the functionality of the user device 104 may be provided by one or more mobile telephones, smartphones, tablet computers, slate computers, smart watches, fitness devices, smart glasses (e.g., the GOOGLE GLASS family of products), other wearable devices, mobile media playback devices, set top devices, navigation devices, laptop computers, notebook computers, ultrabook computers, netbook computers, server computers, computers of other form factors, computing devices of other form factors, other computing systems, other computing devices, and/or the like. It should be understood that the functionality of the user device 104 can be provided by a single device, by two or more similar devices, and/or by two or more dissimilar devices.

The connected vehicle 106 can be a vehicle, truck, van, motorcycle, moped, go-kart, golf cart, or any other ground-based vehicle configured to transport one or more passengers and/or cargo. The connected vehicle 106 can be driven by the user 102 and/or another person. The connected vehicle 106, in some embodiments, is capable of operating in at least a partially autonomous control mode. The connected vehicle 106, in some embodiments, is a fully autonomous vehicle. In some embodiments, the connected vehicle 106 can operate as a level 3 or level 4 vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. The GOOGLE vehicle, available from GOOGLE, is an example of a limited self-driving automation vehicle. The NHTSA defines a level 4 vehicle as a full self-driving automation vehicle that is designed to perform all safety-critical driving functions and monitor roadway conditions for an entire trip to a destination. Such a design anticipates that a user will provide destination or navigation input, but is not expected to be available for control at any time during the trip. This includes both occupied and unoccupied vehicles.

Moreover, the user device 104 can be independent of the connected vehicle 106 or integrated with the connected vehicle 106. In some embodiments, the user device 104 is configured to communicate with the connected vehicle 106 via a wired connection such as universal serial bus ("USB") or via a wireless connection such as BLUETOOTH. In some other embodiments, the user device 104 is integrated within the connected vehicle 106 such as part of a vehicle entertainment system (not shown; also commonly referred to as "infotainment"), a vehicle navigation system, a vehicle engine control unit ("ECU"), and/or another computing system of the connected vehicle 106. The user device 104, in some embodiments, can communicate with the connected vehicle 106 via a controller area network ("CAN") bus. The user device 104 may be retrofitted into the connected vehicle 106 as aftermarket equipment or may be made available as standard or optional original equipment manufacturer ("OEM") equipment of the connected vehicle 106.

The network 114 can include software-defined network ("SDN") components 115, such as one or more SDN controllers that control different aspects of the network 114. For example, the SDN components 115 can include a RAN SDN controller, a network edge SDN controller, and a network core SDN controller. The SDN controllers can obtain information from the parts of the network 114 for which each SDN controller is responsible, such as the RAN, the network edge, and the core network. Based on network fault and performance information, the RAN SDN controller can make adjustments to the antenna or RAN parameters, the edge SDN controller can modify routes or priorities in edge routers to resolve failures or congestion, and the core SDN controller can modify routes or priorities in the core routers.

Packets from the connected vehicle 106 can be labelled into a separate class through Class of Service ("CoS") parameters so that each of the packets can be measured separately. Actions taken to help the connected vehicle 106 may affect other traffic, possibly negatively, although the differential positive impact of actions on traffic from the connected vehicle 106 can be taken into consideration. This same labelling can provide insight into communication issues such as congestion, latency, and disconnects for the connected vehicle 106 on a priority basis.

In addition, the SDN components 115 can include an SDN controller specifically for connected vehicles, such as the connected vehicle 106. The connected vehicle SDN controller can be provided as a service to vehicle owners directly or through manufacturers. This would allow the network provider to make changes to the vehicle networking if a problem is encountered. Because of safety concerns, the vehicle operator, such as the user 102, can be notified before any changes are made and to obtain approval for the change(s). Mobile network operators can use the same networking to notify the owner/driver or manufacturer of any communications impairment or outage that requires the action. Information for notification could be posted in an event bus with the edge site collecting local information and a global site connected to the backbone and mining information from all edge sites. Vehicles could connect to the event bus to receive notifications of this sort.

The network 114 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), 5G-NR, and the like. The RAN 108 can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the user device 104 and the connected vehicle 106. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, 5G-NR, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, 5G RAN, any combination thereof, and/or the like.

The RAN 108 can provide the user device 104 and the connected vehicle 106 access to the network 114 over which to communicate with a vehicle communication support system 116. The vehicle communication support system 116 is utilized to implement aspects of the concepts and technologies described herein. The illustrated vehicle communication support system 116 encompasses several components, each of which may be combined into a single system as shown, or may be implemented as separate components capable of communicating together to share information. The vehicle communication support system 116 can include any hardware, software, firmware, or some combination thereof in any configuration to implement aspects of the concepts and technologies disclosed herein. For example, the vehicle communication support system 116, or one or more components thereof, can be implemented, at least in part, on a computer system, such as on an example computer system 300 shown in FIG. 3. Alternatively, the vehicle communication support system 116, or one or more components thereof, can be implemented, at least in part, on an example virtualization cloud architecture 700 shown in FIG. 7.

The illustrated vehicle communication support system 116 includes a profile creator 118, a network performance estimator 120, a network performance analyzer 122, and a vehicle communication support actualizer 124. As noted above, in some embodiments, these components can be implemented by a single system or by multiple systems, on physical or virtualized hardware resources. In some embodiments, the components above are implemented as one or more software modules, each including instructions that, when executed by one or more processors of the vehicle communications support system 116, causes the processor(s) to perform operations described herein.

The profile creator 118 can create a connected vehicle profile 126 associated with the connected vehicle 106. The connected vehicle profile 126 can include driving data 128 associated with where (geographically) the connected vehicle 106 has been driven by the user 102 and/or autonomously. The driving data 128 can include, for each driving instance, a date, a start time, an end time, and/or a duration of the driving instance. The driving data 128 can include any other data associated with one or more driving instances associated with the connected vehicle 106. For example, the driving data 128 can include data obtained from one or more sensors (not shown) of the connected vehicle 106. The driving data 128 obtained from sensors can include throttle input data, brake input data, steering input data, and/or any other data associated with how the connected vehicle 106 is driven. The driving data 128 can be collected and superfluous driving data 128 can be deleted over time, and the connected vehicle profile 126 updated accordingly.

The profile creator 118 can also utilize the driving data 128 to create one or more driving patterns indicative of how the connected vehicle 106 is driven over time. The connected vehicle profile 126 can additionally include connection data 130 associated with connections between the connected vehicle 106 and the RAN 108, and more particularly, to which of the base station(s) 112 the connected vehicle 106 was connected to and the corresponding cell(s) 110, which can be identified by cell ID, for example. Other connection data 130 can include the type of connection (e.g., voice connection, data connection, or combined voice/data connection), connection duration, connection data download speed, connection data upload speed, and/or any other quantitative data that can be obtained for a given connection. The connection data 130 can also be utilized to create one or more driving patterns, either specifically connection-related patterns or a combination pattern that incorporates both the driving data 128 and the connection data 130. The profile creator 118 can derive driving patterns for the connected vehicle 106 based on the historical network connection session data, and use the driving patterns to predict when and where the connected vehicle 106 might be at a given time, even if the connected vehicle 106 loses connection.

The network performance estimator 120 can estimate performance of at least a portion of one or more networks, such as the RAN 108 and/or the network 114. In some embodiments, the network performance estimator 120 can estimate performance of one or more of the cells 110 of the RAN 108 based upon the historic performance thereof with respect to one or more performance metrics, which can be derived from historical values of the connection data 130. The performance metrics can include, but are not limited to, uptime, network jitter, bandwidth, throughput, signal strength, packet re-transmissions, latency, and the like. Data associated with one or more performance metrics can be obtained by the network performance analyzer 122 over time and added to a collection of performance data from which the network performance estimator 120 can derive network performance estimates based upon historic performance.

The vehicle communication support actualizer 124 can utilize the connected vehicle profile 126, including the driving data 128 and the connection data 130, and network performance estimates output by the network performance estimator 120 to determine whether the connected vehicle 106 has experienced or will experience some degradation in network performance, such as reduced signal strength, complete loss of signal, or any other partial or complete failure of at least a portion of the network 114. In addition, the vehicle communication support actualizer 124 can receive data from one or more other systems 131, such as, a traffic service system, a vehicle manufacturer system, a navigation service system, combinations thereof, and/or the like. A traffic service system can provide traffic data to the vehicle communication support system 116. The vehicle manufacturer system can be or can include one or more servers for a service such as ONSTAR (available from GENERAL MOTORS CORPORATION) and/or other similar service available from other manufacturers. The vehicle manufacturer system can share service data associated with the connected vehicle 106 from such service(s). The service data can include, for example, data associated with remote monitoring, remediation, security, and/or other capabilities of the service. The navigation service system can provide navigation information associated with navigational routes previously used and/or currently used by the connected vehicle 106.

The vehicle communication support actualizer 124 can monitor failures along roads during known periods of network congestion, such as inclement weather and other potential sources of reduced network performance to ensure that mobile vehicle communications, such as to/from the connected vehicle 106, are prioritized. The vehicle communication support actualizer 124 can designate network traffic from moving vehicles with a higher priority than network traffic from stationary vehicles. In addition, failures of wired connection to the cell sites near roads can be mitigated by failing over network traffic to a redundant or secondary link. Failures deeper within the network 114 (e.g., the core network) can also cause congestion. The vehicle communication support actualizer 124 can access a complete view of the network 114 (e.g., from a global network operations center) and can determine how to re-route network traffic around the failure using tunneling protocols.

The vehicle communication support actualizer 124 can also instruct other network components (e.g., the base station(s) 112, other components of the RAN 108, and/or components of the network 114 such as the SDN component(s) 115) to make changes to the network 114 to overcome communication failures. For example, by changing the power or orientation of antennas used by the base station(s) 112, the mobile network operator can decrease dropped calls and decrease latency. In the extreme case of a disaster, the mobile network operator can also deploy mobile radio elements that can be standalone or integrated within the RAN 108 to overcome failures and damage to physical network structures.

The mobile network operator can also work with vehicle manufacturers to ensure proper redundancy of communication components within connected vehicles, such as the connected vehicle 106. The mobile network operator can provide security guidance to ensure secure communication within connected vehicles, such as the connected vehicle 106. The mobile network operator can also guide the manufacturers to help prevent security breaches from external sources. Mobile communication components, such as a connected vehicle wireless communications component 136, can also be designed to operate on multiple frequencies in case of failures. Moreover, because the mobile network operators have visibility to many attack vectors, the mobile network operators can provide early intelligence to manufacturers regarding vulnerabilities that need to be patched or mitigated. The mobile network operators may also be able to update in-vehicle firewalls dynamically based on the threats and vulnerabilities.

If a communication impairment or outage does occur, the mobile network operator could notify the owner/driver (e.g., the user 102) and/or manufacturer of the vehicle of the condition, possibly with guidance (e.g., turn off driver assist, pull over, rerouting instructions directed to the user 102 and/or the connected vehicle 106, or provide a warning such as a warning of communication gap). In the future, the mobile network operator could provide input to an agent in the vehicle, which could use the information to take an appropriate action (e.g., pull over). For example, the mobile network operator could make the driver or agent aware of severe thunderstorms, deep standing water, or forest fires. While ONSTAR and similar systems might have some of the same capabilities, the mobile network operator can collect the information from multiple channels (e.g., FirstNet) and sensors on the network 114 that these systems do not have access to.

The illustrated connected vehicle 106, in addition to the connected vehicle profile 126 described above, can include a connected vehicle processor 132, a connected vehicle memory 134, the connected vehicle wireless communications component 136, a connected vehicle operating system 138, and one or more connected vehicle software applications 140. Each of these components will now be described in detail.

The connected vehicle processor 132 can include one or more hardware components that perform computations to process data, and/or to execute computer-executable instructions of one or more application programs such as the connected vehicle software application(s) 140, one or more operating systems such as the connected vehicle operating system 138, and/or other software. The connected vehicle processor 132 can include one or more central processing units ("CPUs") configured with one or more processing cores. The connected vehicle processor 132 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the connected vehicle processor 132 can include one or more discrete GPUs. In some other embodiments, the connected vehicle processor 132 can include CPU and GPU components that are configured in accordance with a co-processing CPU/GPU computing model, wherein the sequential part of an application executes on the CPU and the computationally-intensive part is accelerated by the GPU. The connected vehicle processor 132 can include one or more system-on-chip ("SoC") components along with one or more other components illustrated as being part of the connected vehicle 106, including, for example, the connected vehicle memory 134. In some embodiments, the connected vehicle processor 132 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The connected vehicle processor 132 can be or can include one or more hardware components architected in accordance with an ARM architecture, available for license from ARM HOLDINGS of Cambridge, United Kingdom. Alternatively, the connected vehicle processor 132 can be or can include one or more hardware components architected in accordance with an x86 architecture, such an architecture available from INTEL CORPORATION of Mountain View, California, and others. Those skilled in the art will appreciate the implementation of the connected vehicle processor 132 can utilize various computation architectures, and as such, the connected vehicle processor 132 should not be construed as being limited to any particular computation architecture or combination of computation architectures, including those explicitly disclosed herein.

The connected vehicle memory 134 can include one or more hardware components that perform storage operations, including temporary or permanent storage operations. In some embodiments, the connected vehicle memory 134 can include volatile and/or non-volatile memory implemented in any method or technology for storage of information such as computer-readable instructions, data structures, program modules, the connected vehicle operating system 138, the connected vehicle software application(s) 140, and/or other software, firmware, and/or other data (e.g., the connected vehicle profile 126, including the driving data 128 and the connection data 130) disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the connected vehicle processor 132.

The connected vehicle wireless communications component 136 can include one or more wireless wide area network ("WWAN") components capable of facilitating communication with one or more WWANs, such as the network 114 via the RAN 108. In some embodiments, the connected vehicle wireless communications component 136 is configured to provide multi-mode connectivity. For example, the connected vehicle wireless communications component 136 may be configured to provide connectivity to the RAN 108, wherein the RAN 108 functions in accordance with one or more radio access technologies ("RATs"). Alternatively, multiple connected vehicle wireless communications components 136 may be utilized to perform such functionality, and/or provide additional functionality to support other non-compatible technologies (i.e., incapable of being supported by a single WWAN component).

The connected vehicle operating system 138 can control the operation of at least a portion of the connected vehicle 106. In some embodiments, the connected vehicle operating system 138 includes the functionality of the connected vehicle software application(s) 140. The connected vehicle operating system 138 can be executed by the connected vehicle processor 132 to cause the connected vehicle 106 to perform various operations. The connected vehicle operating system 138 can include a member of the WINDOWS family of operating systems from MICROSOFT CORPORATION, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The connected vehicle software application(s) 140 can execute on top of the connected vehicle operating system 138. The connected vehicle software application(s) 140 can be executed by the connected device processor 132 to cause the connected vehicle 106 to perform various operations described herein. For example, the connected vehicle software application(s) 140 can be part of a vehicle entertainment system, a vehicle navigation system, a vehicle ECU, and/or another computing system of the user vehicle.

Turning now to FIG. 2, a method 200 for providing communication support for connected vehicles, such as the connected vehicle 106, will be described, according to an illustrative embodiment of the concepts and technologies disclosed herein. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described primarily from the perspective of the vehicle communication support system 116, including the various components thereof described above with respect to FIG. 1. The method 200 begins and proceeds to operation 202. At operation 202, the connected vehicle 106 connects to the network 114, via the RAN 108. Also at operation 202, the connected vehicle 106 provides data to the vehicle communication support system 116. The data can include driving data 128 associated with where (geographically) the connected vehicle 106 has been driven by the user 102 and/or autonomously. The driving data 128 can include, for each driving instance, a date, a start time, an end time, and/or a duration of the driving instance. The driving data 128 can include any other data associated with one or more driving instances associated with the connected vehicle 106. For example, the driving data 128 can include data obtained from one or more sensors (not shown) of the connected vehicle 106. The driving data 128 obtained from sensors can include throttle input data, brake input data, steering input data, and/or any other data associated with how the connected vehicle 106 is driven. The driving data 128 can be collected and superfluous driving data 128 can be deleted over time, and the connected vehicle profile 126 updated accordingly. The data also can include connection data 130 associated with connections between the connected vehicle 106 and the RAN 108, and more particularly, to which of the base station(s) 112 the connected vehicle 106 was connected to and the corresponding cell(s) 110, which can be identified by cell ID, for example. Other connection data 130 can include the type of connection (e.g., voice connection, data connection, or combined voice/data connection), connection duration, connection data download speed, connection data upload speed, and/or any other quantitative data that can be obtained for a given connection.

From operation 202, the method 200 proceeds to operation 204. At operation 204, the vehicle communication support system 116 utilizes the data (e.g., the driving data 128 and the connection data 130) received from the connected vehicle 106 to determine whether the connected vehicle 106 has experienced network degradation, such as reduced signal strength, complete loss of signal, or any other partial or complete failure of at least a portion of the network 114. At operation 204, the vehicle communication support system 116 also can determine whether the connected vehicle 106 will experience network degradation. In some embodiments, part of these determinations can be based upon one or more driving patterns derived from the driving data 128 and/or the connection data 130. The vehicle communication support system 116 can utilize the driving data 128 to create one or more driving patterns indicative of how the connected vehicle 106 is driven over time. The connection data 130 can also be utilized to create one or more driving patterns, either specifically connection-related patterns or a combination pattern that incorporates both the driving data 128 and the connection data 130. The vehicle communication support system 116 can derive driving patterns for the connected vehicle 106 based on the historical network connection session data, and use the driving patterns to predict when and where the connected vehicle 106 might be at a given time, even if the connected vehicle 106 loses connection. The vehicle communication support system 116 can also utilize network performance estimates output from the network performance estimator 120 in making the determination of whether connected vehicle 106 will experience network degradation.

From operation 204, the method 200 proceeds to operation 206. At operation 206, the vehicle communication support system 116 monitors the network 114 for failures along roads during known periods of potential network degradation, such as inclement weather.

From operation 206, the method 200 proceeds to operation 208. At operation 208, in response to determining that the connected vehicle 106 has experienced or will experience network degradation, the vehicle communication support system 116 can communicate with the user 102 and/or the connected vehicle 106 to provide a warning and corrective action(s). Also at operation 208, in response to determining that the connected vehicle 106 has experienced or will experience network degradation, the vehicle communication support system 116 can instruct one or more network components of the network 114 to change one or more aspects of the network 114 to overcome the network degradation. In some embodiments, the vehicle communication support system 116 can designate network traffic from moving vehicles with a higher priority than network traffic from stationary vehicles. In addition, failures of wired connection to the cell sites near roads can be mitigated by failing over network traffic to a redundant or secondary link. Failures deeper within the network 114 (e.g., the core network) can also cause congestion. The vehicle communication support system 116 can access a complete view of the network 114 (e.g., from a global network operations center) and can determine how to re-route network traffic around the failure using tunneling protocols. The vehicle communication support system 116 can also instruct other network components (e.g., the base station(s) 112, other components of the RAN 108, and/or components of the network 114 such as the SDN component(s) 115) to make changes to the network 114 to overcome communication failures. For example, by changing the power or orientation of antennas used by the base station(s) 112, the mobile network operator can decrease dropped calls and decrease latency. In the extreme case of a disaster, the mobile network operator can also deploy mobile radio elements that can be standalone or integrated within the RAN 108 to overcome failures and damage to physical network structures.

From operation 208, the method 200 proceeds to operation 210. The method 200 can end at operation 210.

Figure 3:
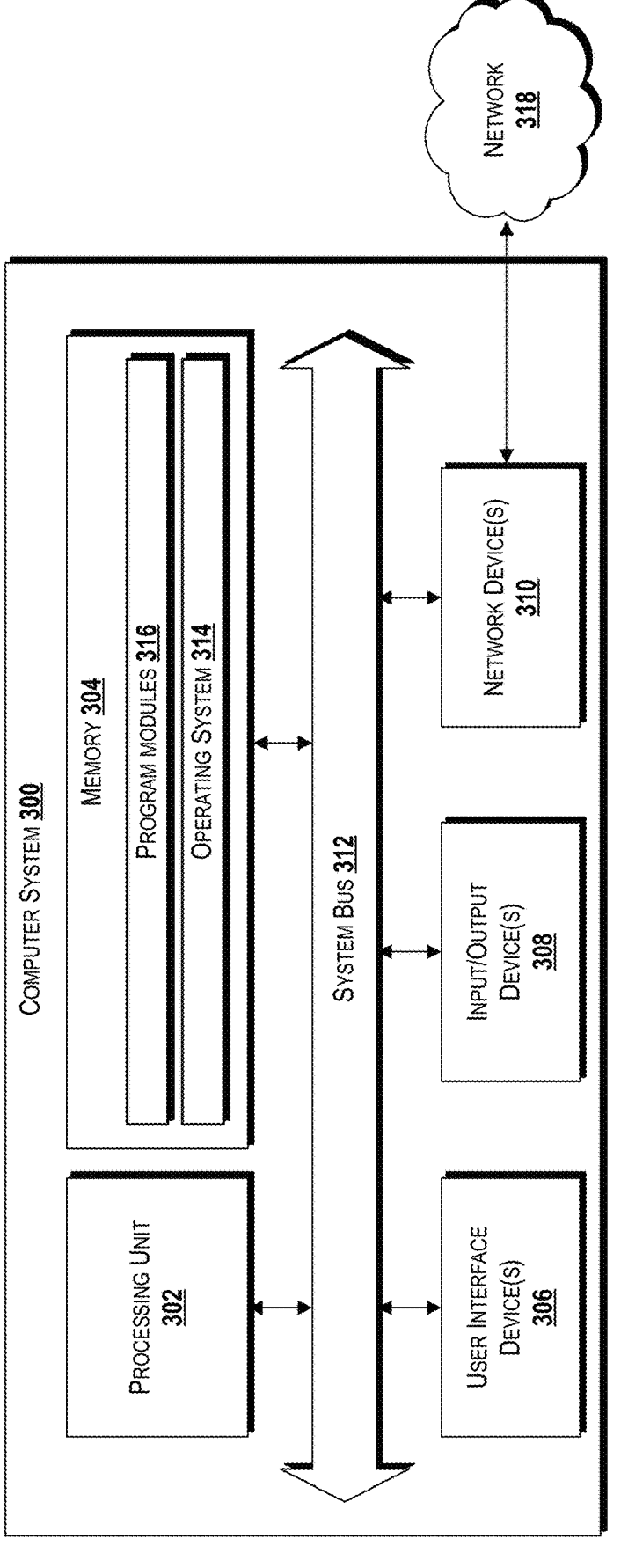
FIG. 3 is a block diagram illustrating an example computer system capable of implementing aspects of the concepts and technologies disclosed herein.

Turning now to FIG. 3, a block diagram illustrating a computer system 300 configured to provide the functionality described herein in accordance with various embodiments. In some embodiments, the user device 104, the connected vehicle 106, the vehicle communication support system 116, the other system(s) 131, or some combination thereof can be configured the same as or similar to the computer system 300.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 (e.g., the connected vehicle operating system 138) and one or more program modules 316. The operating system 314 can include, but is not limited to, members of the WINDOWS family of operating systems from MICROSOFT CORPORATION, the LINUX family of operating systems, families of operating systems from APPLE CORPORATION, other operating systems, and/or the like.

The program modules 316 may include various software and/or program modules described herein. The program modules 316 can include the connected vehicle software application(s) 140 in embodiments of the connected vehicle 106 configured similar to or the same as the computer system 300. The program modules 316 can include the profile creator 118, the network performance estimator 120, the network performance analyzer 122, and the vehicle communication support actualizer 124 in embodiments of the vehicle communication support system 116 configured similar to or the same as the computer system 300. In some embodiments, multiple implementations of the computer system 300 can be used, wherein each implementation is configured to execute one or more of the program modules 316. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof. The memory 304 also can be configured to store the driving data 128, the connection data 130, other data disclosed herein, or a combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display or printer.

The network devices 310 enable the computer system 300 to communicate with other networks or remote systems via the network(s) 318, such as the network(s) 114. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 114 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
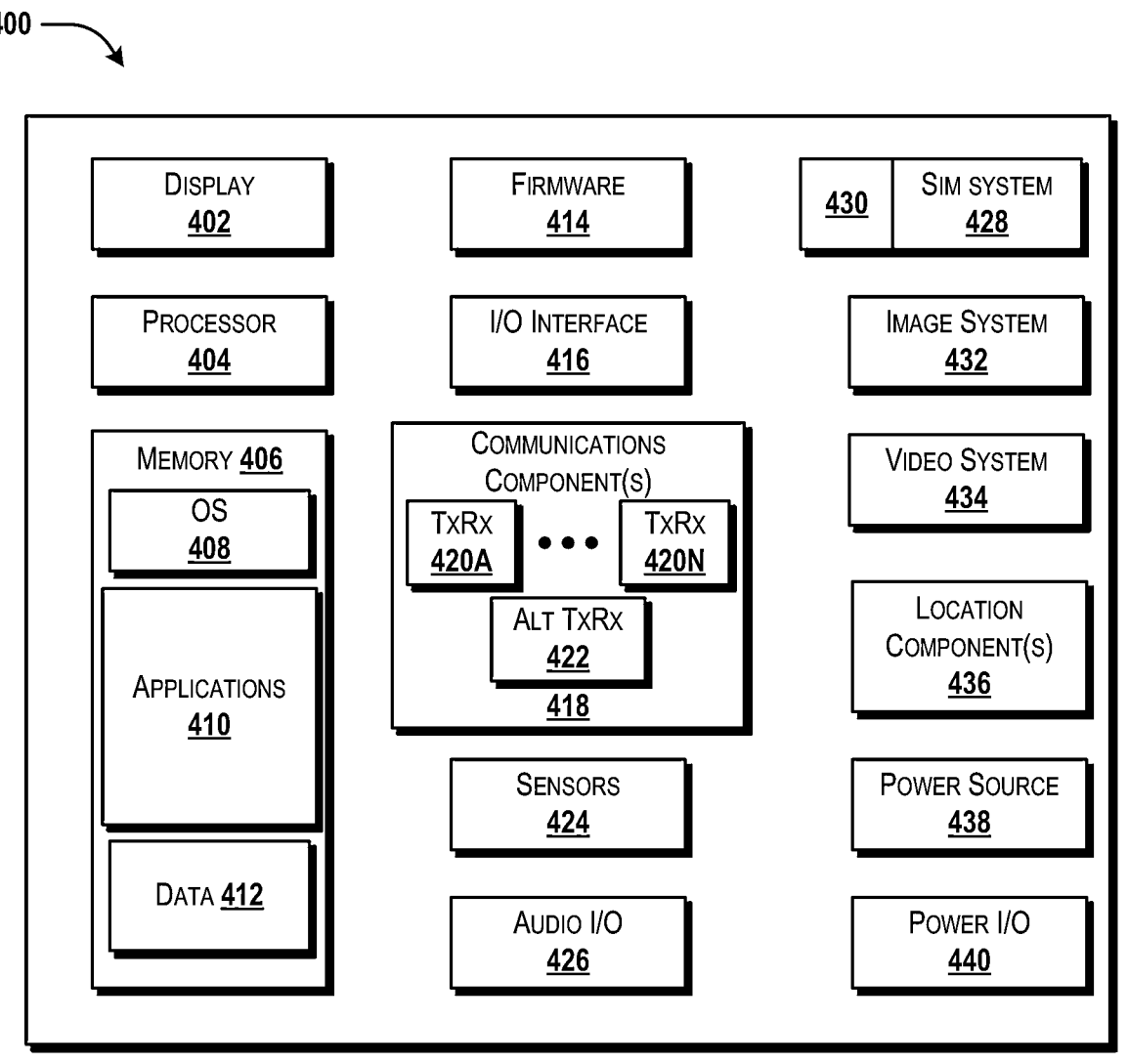
FIG. 4 is a block diagram illustrating an example mobile device capable of implementing aspects of the concepts and technologies disclosed herein.

Turning now to FIG. 4, an illustrative mobile device 400 and components thereof will be described. In some embodiments, the user device 104 can be configured the same as or similar to the mobile device 400. In some embodiments, the connected vehicle 106 can be configured the same as or similar to the mobile device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 can also include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408 (e.g., the connected vehicle operating system 138), one or more applications 410, other computer-executable instructions stored in the memory 406, or the like. The application(s) 410 can include the connected vehicle software application(s) 140.

The UI application can interface with the operating system 408 to facilitate user interaction with functionality and/or data stored at the mobile device 400 and/or stored elsewhere. In some embodiments, the operating system 408 can include a member of the IOS family of operating systems from APPLE INC., a member of the ANDROID OS family of operating systems from GOOGLE LLC, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400. The data 412 can include the driving data 128, the connection data 130, the connected vehicle profile 126, and other data disclosed herein.

The applications 410, the data 412, and/or portions thereof can be stored in the memory 406 and/or in a firmware 414, and can be executed by the processor 404. The firmware 414 can also store code for execution during device power up and power down operations. It can be appreciated that the firmware 414 can be stored in a volatile or non-volatile data storage device including, but not limited to, the memory 406 and/or a portion thereof.

The mobile device 400 can also include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 can also include a communications component 418, such as the connected vehicle wireless communications component 136. The communications component 418 can be configured to interface with the processor 404 to facilitate wired and/or wireless communications with one or more networks, such as the network 114, the Internet, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 418 may facilitate data communications using General Packet Radio Service ("GPRS"), Enhanced Data services for Global Evolution ("EDGE"), the High-Speed Packet Access ("HSPA")

protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 can also include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 can also include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 can also facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 can also include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 can also include a subscriber identity module ("SIM") system 428. The SIM system 428 can include a universal SIM ("USIM"), a universal integrated circuit card ("UICC"), eSIM, and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 can also include an image capture and processing system 432 ("image system"). The image system 432 can be configured to capture or otherwise obtain photos, videos, and/or other visual information. As such, the image system 432 can include cameras, lenses, chargecoupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content can also be shared with other devices via various types of data transfers via wired and/or wireless communication devices as described herein.

The mobile device 400 can also include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 can also be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 can also include a power source 438. The power source 438 can include one or more batteries, power supplies, power cells, and/or other power subsystems including alternating current ("AC") and/or direct current ("DC") power devices. The power source 438 can also interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
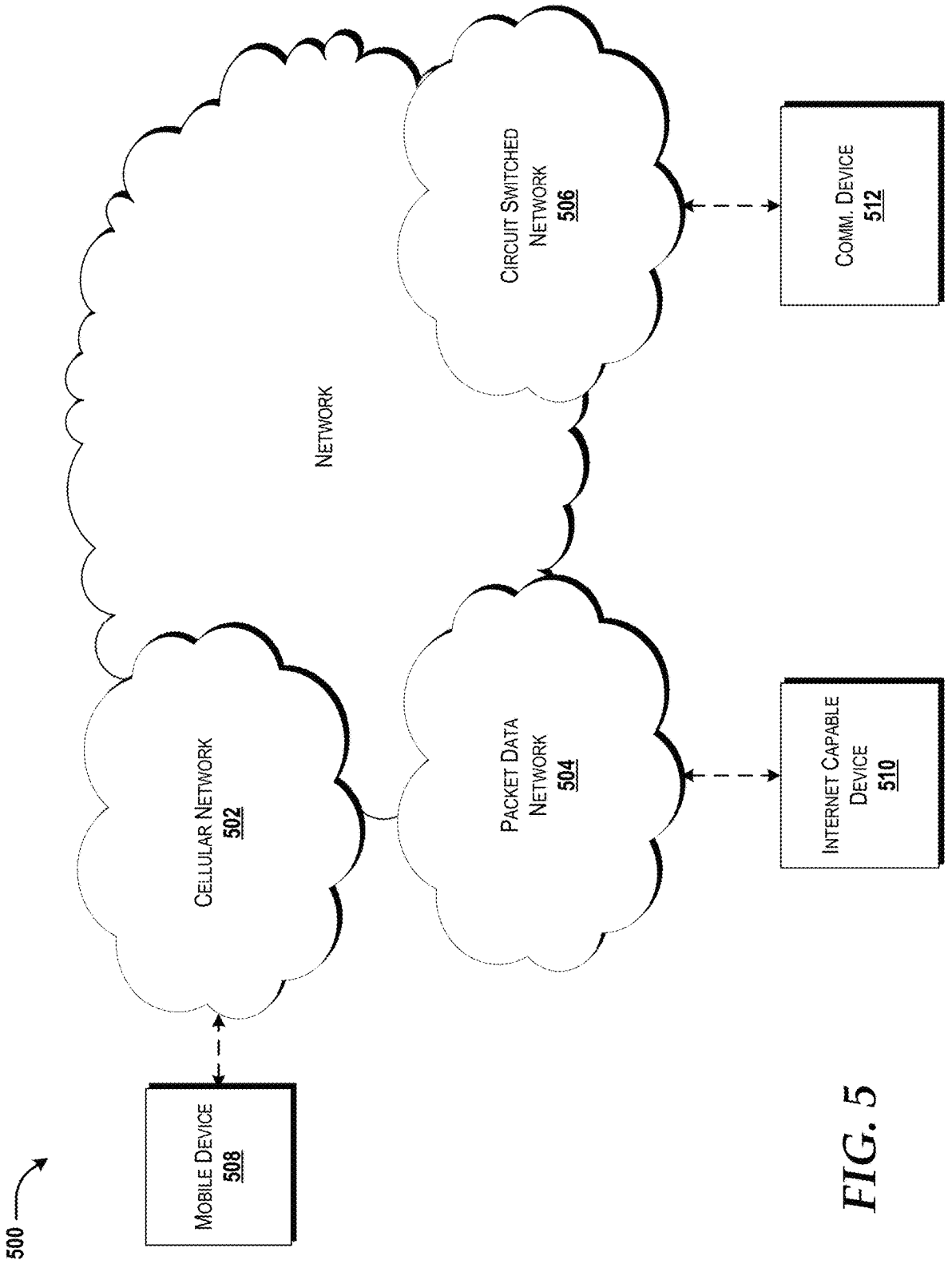
FIG. 5 is a block diagram illustrating an example network capable of implementing aspects of the concepts and technologies disclosed herein.

Turning now to FIG. 5, details of a network 500 are illustrated, according to an illustrative embodiment. In some embodiments, the network(s) 114 shown in FIG. 1 can be configured the same as or similar to the network 500. The network 500 includes a cellular network 502, a packet data network 504, and a circuit switched network 506 (e.g., a public switched telephone network). The cellular network 502 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the user device 104, the mobile device 400, the connected vehicle wireless communications component 136 of the connected vehicle 106, a cellular telephone, a user equipment, a mobile terminal, a PDA, a laptop computer, a handheld computer, and combinations thereof, can be operatively connected to the cellular network 502. The mobile communications device 508 can be configured similar to or the same as the mobile device 400 described above with reference to FIG. 4.

The cellular network 502 can be configured as a GSM network and can provide data communications via GPRS and/or EDGE. Additionally, or alternatively, the cellular network 502 can be configured as a 3G Universal Mobile Telecommunications System ("UMTS") network and can provide data communications via the HSPA protocol family, for example, HSDPA, EUL, and HSPA+. The cellular network 502 also is compatible with mobile communications standards such as LTE, or the like, as well as evolved and future mobile standards.

The packet data network 504 includes various systems, devices, servers, computers, databases, and other devices in communication with one another, as is generally known. The user device 104, the connected vehicle 106, the other system(s) 131, the vehicle communication support system 116, or some combination thereof can communicate with each other via the packet data network 504. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510 such as a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
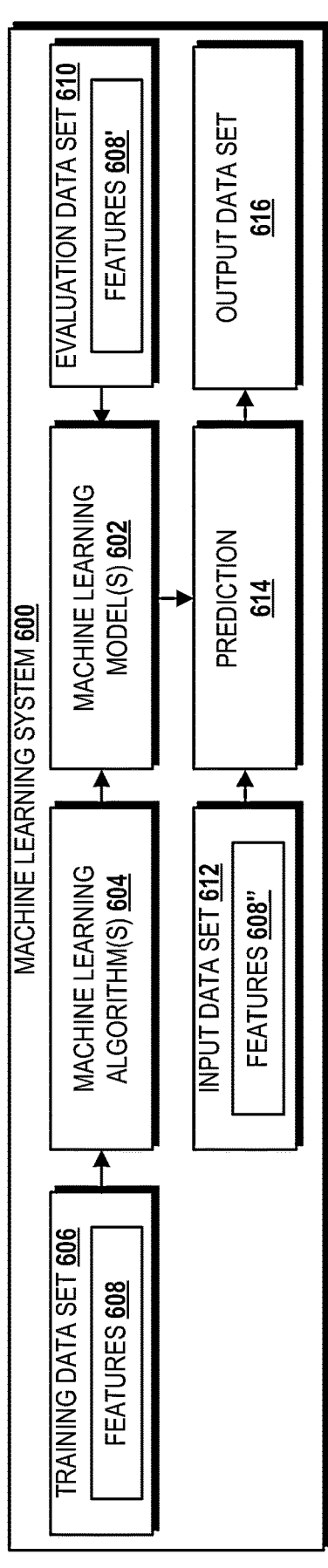
FIG. 6 is a block diagram illustrating an example machine learning system capable of implementing aspects of the concepts and technologies disclosed herein.

Turning now to FIG. 6, a machine learning system 600 capable of implementing aspects of the embodiments disclosed herein will be described. In some embodiments, aspects of the vehicle communication support system 116, such as the network performance estimator 120, can be improved via machine learning. Accordingly, or a combination thereof can include or can be in communication with a machine learning system 600 or multiple machine learning systems 600.

The illustrated machine learning system 600 includes one or more machine learning models 602. The machine learning models 602 can include, unsupervised, supervised, and/or semi-supervised learning models. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Figure 7:
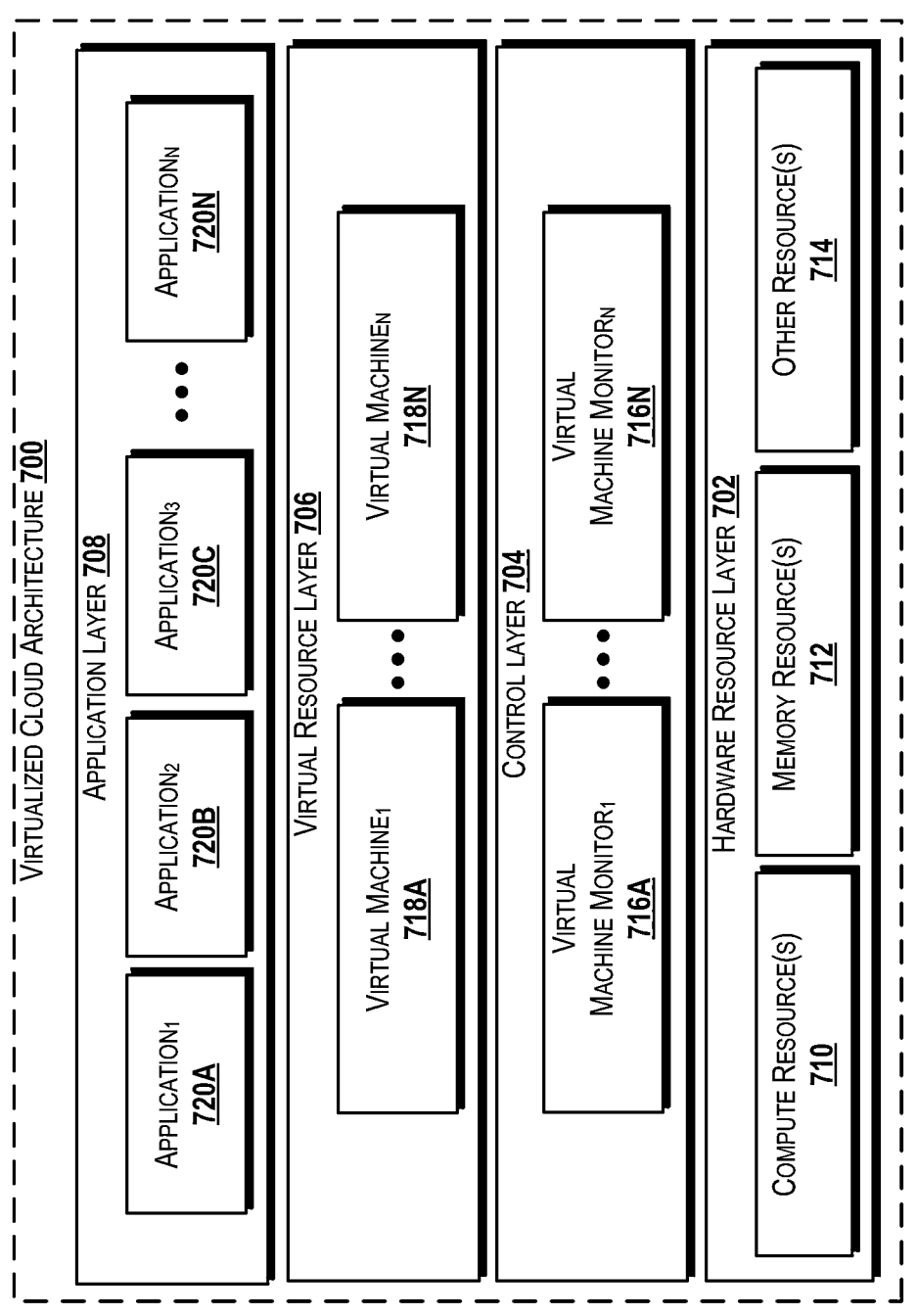
FIG. 7 is a block diagram illustrating a virtualized cloud architecture capable of implementing aspects of the concepts and technologies disclosed herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, at least a portion of the RAN 108, at least a portion of the network 114, at least a portion of the SDN components 115, at least a portion of the other system(s) 131, at least a portion of the vehicle communication support system 116, or any combination thereof. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUAL-COMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, California, and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors;" hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708.

Based on the foregoing, it should be appreciated that aspects of communication support for connected vehicles have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, by a vehicle communication support system comprising a processor, data from a connected vehicle, wherein the connected vehicle is operating in communication with a network, wherein the data comprises driving data and connection data, wherein the driving data identifies a geographic location of the connected vehicle, and wherein the connection data identifies at least one base station to which the connected vehicle was connected and at least one corresponding cell within the network;

determining, by the vehicle communication support system, whether the connected vehicle has experienced a network degradation; and in response to determining that the connected vehicle has experienced the network degradation, instructing at least one network component to change at least one aspect of the network to overcome the network degradation.

2. The method of claim 1, wherein determining, by the vehicle communication support system, whether the connected vehicle has experienced the network degradation is based upon a driving pattern derived, at least in part, from the driving data and the connection data.

3. The method of claim 1, further comprising:

in response to determining that the connected vehicle has experienced the network degradation, notifying, by the vehicle communication support system, the connected vehicle or a user associated with the connected vehicle of the network degradation; and providing a corrective action to be taken.

4. The method of claim 1, further comprising determining, by the vehicle communication support system, whether the connected vehicle will experience the network degradation.

5. The method of claim 4, further comprising estimating, by the vehicle communication support system, a network performance estimate for the network, wherein determining, by the vehicle communication support system, whether the connected vehicle will experience the network degradation is based upon the network performance estimate.

6. The method of claim 1, wherein instructing the at least one network component to change the at least one aspect of the network to overcome the network degradation comprises:

designating network traffic from moving vehicles with a higher priority than network traffic from stationary vehicles;

failing over network traffic;

re-routing network traffic around the network degradation using tunneling protocols;

instructing a software-defined network controller to change the at least one aspect, wherein the at least one aspect comprises an aspect of a radio access network of the network, an aspect of a network edge of the network, or an aspect of a core network of the network; or deploying a mobile radio element.

7. A vehicle communication support system comprising:

a processor; and a memory comprising instructions that, when executed by the processor, cause the processor to perform operations comprising receiving data from a connected vehicle, wherein the connected vehicle is operating in communication with a network, wherein the data comprises driving data and connection data, wherein the driving data identifies a geographic location of the connected vehicle, and wherein the connection data identifies at least one base station to which the connected vehicle was connected and at least one corresponding cell within the network, determining whether the connected vehicle has experienced a network degradation, and in response to determining that the connected vehicle has experienced the network degradation, instructing at least one network component to change at least one aspect of the network to overcome the network degradation.

8. The vehicle communication support system of claim 7, wherein the operations further comprise:

in response to determining that the connected vehicle has experienced the network degradation, notifying the connected vehicle or a user associated with the connected vehicle of the network degradation; and providing a corrective action to be taken.

9. The vehicle communication support system of claim 8, wherein determining whether the connected vehicle has experienced the network degradation is based upon a driving pattern derived, at least in part, from the driving data and the connection data.

10. The vehicle communication support system of claim 8, wherein the operations further comprise determining whether the connected vehicle will experience the network degradation.

11. The vehicle communication support system of claim 10, wherein the operations further comprise estimating a network performance estimate for the network, wherein determining whether the connected vehicle will experience the network degradation is based upon the network performance estimate.

12. The vehicle communication support system of claim 8, wherein instructing the at least one network component to change the at least one aspect of the network to overcome the network degradation comprises:

designating network traffic from moving vehicles with a higher priority than network traffic from stationary vehicles;

failing over network traffic;

re-routing network traffic around the network degradation using tunneling protocols;

instructing a software-defined network controller to change the at least one aspect, wherein the at least one aspect comprises an aspect of a radio access network of the network, an aspect of a network edge of the network, or an aspect of a core network of the network; or deploying a mobile radio element.

13. A computer-readable storage medium comprising computer-executable instructions that, when executed by a processor of a vehicle communication support system, cause the processor to perform operations comprising:

receiving data from a connected vehicle, wherein the connected vehicle is operating in communication with a network, wherein the data comprises driving data and connection data, wherein the driving data identifies a geographic location of the connected vehicle, and wherein the connection data identifies at least one base station to which the connected vehicle was connected and at least one corresponding cell within the network;

determining whether the connected vehicle has experienced a network degradation; and in response to determining that the connected vehicle has experienced the network degradation, instructing at least one network component to change at least one aspect of the network to overcome the network degradation.

14. The computer-readable storage medium of claim 13, wherein determining whether the connected vehicle has experienced the network degradation is based upon a driving pattern derived, at least in part, from the driving data and the connection data.

15. The computer-readable storage medium of claim 13, wherein the operations further comprise:

in response to determining that the connected vehicle has experienced the network degradation, notifying, by the vehicle communication support system, the connected vehicle or a user associated with the connected vehicle of the network degradation; and providing a corrective action to be taken.

16. The computer-readable storage medium of claim 13, wherein the operations further comprise estimating a network performance estimate for the network, wherein determining whether the connected vehicle will experience the network degradation is based upon the network performance estimate.

17. The computer-readable storage medium of claim 13, wherein instructing the at least one network component to change the at least one aspect of the network to overcome the network degradation comprises:

designating network traffic from moving vehicles with a higher priority than network traffic from stationary vehicles;

failing over network traffic;

re-routing network traffic around the network degradation using tunneling protocols;

instructing a software-defined network controller to change the at least one aspect, wherein the at least one aspect comprises an aspect of a radio access network of the network, an aspect of a network edge of the network, or an aspect of a core network of the network; or deploying a mobile radio element.

* * * * *